(12) United States Patent
Greenbacker et al.

(10) Patent No.: US 11,336,587 B1
(45) Date of Patent: May 17, 2022

(54) ELECTRONIC SYSTEM FOR GENERATION AND MANAGEMENT OF CONTROLLED-USE RESOURCES

(71) Applicant: BANK OF AMERICA CORPORATION, Charlotte, NC (US)

(72) Inventors: Robertson Walters Greenbacker, Charlotte, NC (US); Brian Wallace Borneman, Waterville, WA (US); Justin Riley duPont, Charlotte, NC (US); Tony England, Tega Cay, SC (US); Timothy Stephen Nurse, Charlotte, NC (US); Stephen Philip Selfridge, Huntersville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/199,070

(22) Filed: Mar. 11, 2021

(51) Int. Cl.
| | | |
|---|---|---|
| *H04L 12/927* | (2013.01) | |
| *H04L 47/80* | (2022.01) | |
| *H04L 47/762* | (2022.01) | |
| *H04L 47/74* | (2022.01) | |
| *G06N 20/00* | (2019.01) | |
| *G06Q 20/40* | (2012.01) | |
| *G06Q 10/06* | (2012.01) | |

(52) U.S. Cl.
CPC ........... *H04L 47/803* (2013.01); *G06N 20/00* (2019.01); *G06Q 10/06315* (2013.01); *G06Q 20/401* (2013.01); *H04L 47/745* (2013.01); *H04L 47/748* (2013.01); *H04L 47/762* (2013.01)

(58) Field of Classification Search
CPC ...... G06Q 40/02; G06Q 20/105; G06Q 30/06; G06Q 20/085; G06Q 20/346; G06Q 20/348; G06Q 20/401; G06Q 10/06315; H04L 47/745; H04L 47/748; H04L 47/762; H04L 47/803; G06N 20/00
See application file for complete search history.

(56) References Cited

U.S. PATENT DOCUMENTS

| | | | |
|---|---|---|---|
| 6,609,113 B1 | 8/2003 | O'Leary et al. | |
| 7,177,836 B1 | 2/2007 | German et al. | |
| 7,451,114 B1 | 11/2008 | Matsuda et al. | |
| 8,099,359 B1 | 1/2012 | Coyle et al. | |
| 8,244,632 B2 | 8/2012 | Algiene et al. | |
| 8,738,521 B2 | 5/2014 | O'Leary et al. | |
| 9,384,476 B2 | 7/2016 | Hanna et al. | |
| 9,626,701 B2 | 4/2017 | Capps et al. | |
| 9,824,376 B1 * | 11/2017 | Amacker | G06Q 30/06 |

(Continued)

*Primary Examiner* — Shean Tokuta
(74) *Attorney, Agent, or Firm* — Moore & Van Allen PLLC; Gabrielle M. Carlini

(57) ABSTRACT

Embodiments of the invention are directed to systems, methods, and computer program products for generation and management of controlled-use resources which allow the sender of an electronic resource transfer to limit the ways in which the recipient may use the received resources. This invention allows the sender to maintain control over the products or services purchased with transferred resources, as well as personalize a transfer for a recipient by selecting a favorite merchant or spending category of the recipient. The invention may also benefit a plurality of merchants and other third party entities which may obtain new customers as a result of said customers receiving controlled-use resources designated for said merchants.

20 Claims, 5 Drawing Sheets

(56) References Cited

U.S. PATENT DOCUMENTS

| | | |
|---|---|---|
| 9,996,826 B2 | 6/2018 | Levchin et al. |
| 10,410,207 B1* | 9/2019 | Butler .................. G06Q 20/356 |
| 10,891,606 B2 | 1/2021 | Chiarella et al. |
| 11,037,154 B1* | 6/2021 | Costilla ................ G06V 40/172 |
| 2001/0011250 A1 | 8/2001 | Paltenghe et al. |
| 2002/0087461 A1 | 7/2002 | Ganesan et al. |
| 2011/0213699 A1 | 9/2011 | Johnson |
| 2012/0253852 A1* | 10/2012 | Pourfallah ........... G06Q 20/326 |
| | | 705/41 |
| 2013/0144734 A1 | 6/2013 | Perkins et al. |
| 2013/0204739 A1* | 8/2013 | Friedman ............... G06Q 30/02 |
| | | 705/26.7 |
| 2013/0218776 A1* | 8/2013 | Monaghan ........... G06Q 20/405 |
| | | 705/44 |
| 2014/0207662 A1* | 7/2014 | Isaacson .............. G06Q 20/384 |
| | | 705/39 |
| 2014/0250003 A1 | 9/2014 | Levchin et al. |
| 2014/0258055 A1* | 9/2014 | Wolfe .................. G06Q 20/321 |
| | | 705/30 |
| 2014/0279451 A1 | 9/2014 | Saadat et al. |
| 2014/0297525 A1 | 10/2014 | Levchin et al. |
| 2014/0304154 A1 | 10/2014 | Levchin et al. |
| 2014/0344089 A1 | 11/2014 | Hanna et al. |
| 2015/0310567 A1* | 10/2015 | Wu ........................ G06Q 20/10 |
| | | 705/26.5 |
| 2016/0071175 A1* | 3/2016 | Reuss ................ G06Q 20/4014 |
| | | 705/26.25 |
| 2016/0180325 A1* | 6/2016 | Davis ................... G06Q 20/386 |
| | | 705/44 |
| 2016/0314444 A1 | 10/2016 | Hanna et al. |
| 2016/0344675 A1* | 11/2016 | Samaras ................. H04L 51/32 |
| 2016/0371668 A1 | 12/2016 | Priebatsch ........... G06Q 20/348 |
| 2017/0046695 A1* | 2/2017 | Collings ......... G06K 19/06037 |
| 2018/0165675 A1* | 6/2018 | Isaacson .............. G06Q 20/105 |
| 2019/0073664 A1* | 3/2019 | Schölzki ................ G06Q 20/24 |
| 2019/0080303 A1* | 3/2019 | Nair ....................... G06F 1/1694 |
| 2019/0213651 A1* | 7/2019 | DeLuca ................ G06Q 50/01 |
| 2019/0325778 A1* | 10/2019 | Singh ..................... H04L 67/22 |
| 2019/0392418 A1* | 12/2019 | Butler .................... G06Q 20/36 |
| 2021/0090145 A1* | 3/2021 | David ................ G06Q 30/0617 |
| 2021/0158323 A1* | 5/2021 | Mimassi ................ G06Q 50/12 |

* cited by examiner

ELECTRONIC SYSTEM FOR GENERATION AND MANAGEMENT OF CONTROLLED-USE RESOURCES

BACKGROUND

Network-based resource transfers between users are growing in popularity due to their ease of use and ability to be executed from any location. One of the limitations of such transfers, however, is that a sender has no ability to specify or control how the electronic resources are used by the recipient. As such, a need exists for a system which is able to generate and manage electronic controlled-use resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for generation and management of controlled-use resources, the invention including: monitoring a managing entity system and identifying a pending network-based resource transfer; receiving, from the managing entity system, information associated with the pending network-based resource transfer; determining, based on the received information, that the pending network-based resource transfer is able to be completed as a controlled-use resource transfer; and transmitting, to the managing entity system, instructions to execute the pending network-based resource transfer as a controlled-use resource transfer, where the instructions include: prompting a sender, via a user device, to select a recipient of the controlled-use resource transfer, an amount of resources to transfer, and at least one limitation for the controlled-use resource transfer, creating a temporary account for the recipient, and depositing the amount of resources into the temporary account.

In some embodiments, the information associated with the pending network-based resource transfer includes information identifying a sender, information identifying a recipient, a transaction amount, and a transaction description.

In some embodiments, determining, based on the received information, that the pending network-based resource transfer is able to be completed as a controlled-use resource transfer further includes utilizing a machine learning engine.

In some embodiments, the machine learning engine is configured to analyze at least one of: some or all of the received information, one or more machine learning datasets, or one or more historical datasets to determine whether the pending network-based resource transfer is able to be completed as a controlled-use resource transfer.

In some embodiments, selecting at least one limitation for the controlled-use resource transfer includes selecting a merchant, a group of a merchants, or a spending category for which the resource amount of the controlled-use resource transfer can be utilized.

In some embodiments, prompting a sender, via a user device, to select a recipient of the controlled-use resource transfer, an amount of resources to transfer, and at least one limitation for the controlled-use resource transfer further includes presenting, via the user device, a plurality of merchant or spending category suggestions based on a transaction history of the recipient, a location of the recipient, or a text description of the pending network-based transfer.

In some embodiments, the transmitted instructions further include presenting, on a user device associated with the recipient, an indication of an amount of controlled-use resources available, a description of a limitation associated with the amount of available controlled-use resources, and a computer-readable code which allows the recipient to utilize the amount of controlled-use resources.

In some embodiments, the invention further includes transmitting to the managing entity system, based on identifying a triggering event, instructions to execute a resource management action.

In some embodiments, a triggering event includes one or more of: a predetermined period of time elapsing since use of a controlled-use resource, a merchant associated with a controlled-use resource ceasing operations, an available amount of controlled-use resources decreasing below a predetermined threshold amount, or the managing entity system receiving a recipient request to execute a resource management action.

In some embodiments, a resource management action includes at least one of: transferring an amount of controlled-use resources from the temporary account to another account owned by the recipient or transferring an amount of controlled-use resources from the temporary account to an account managed by the sender.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
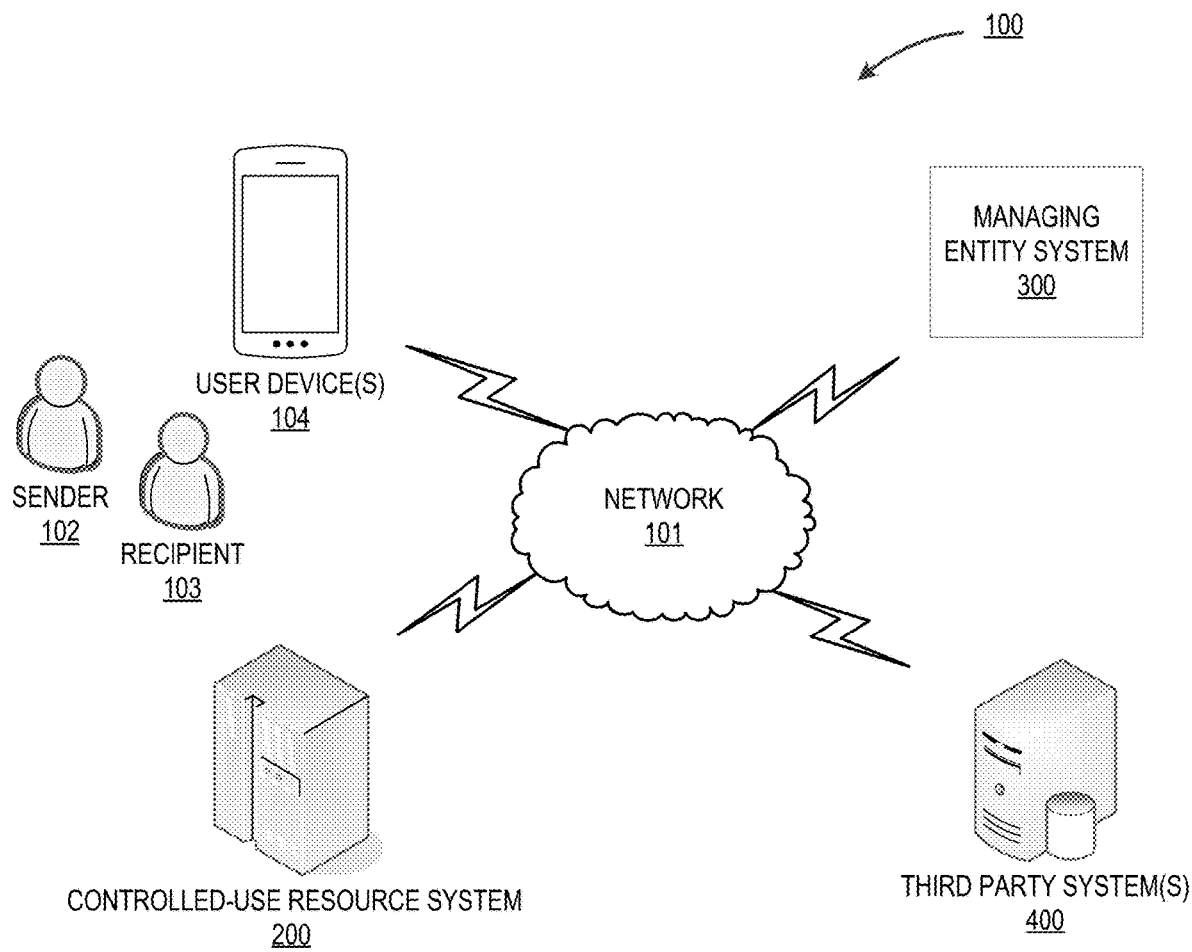
Figure 2:
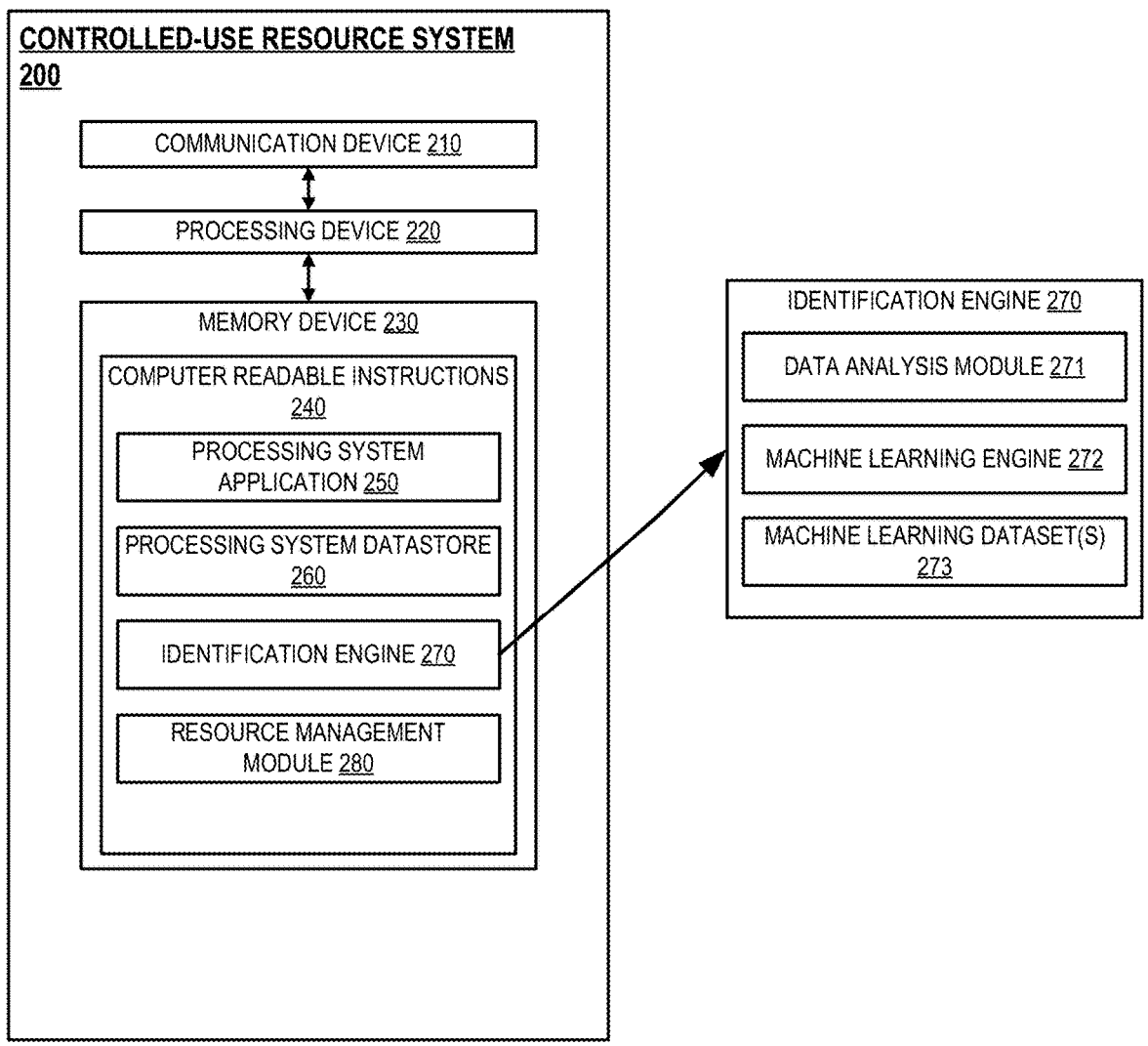
Figure 3:
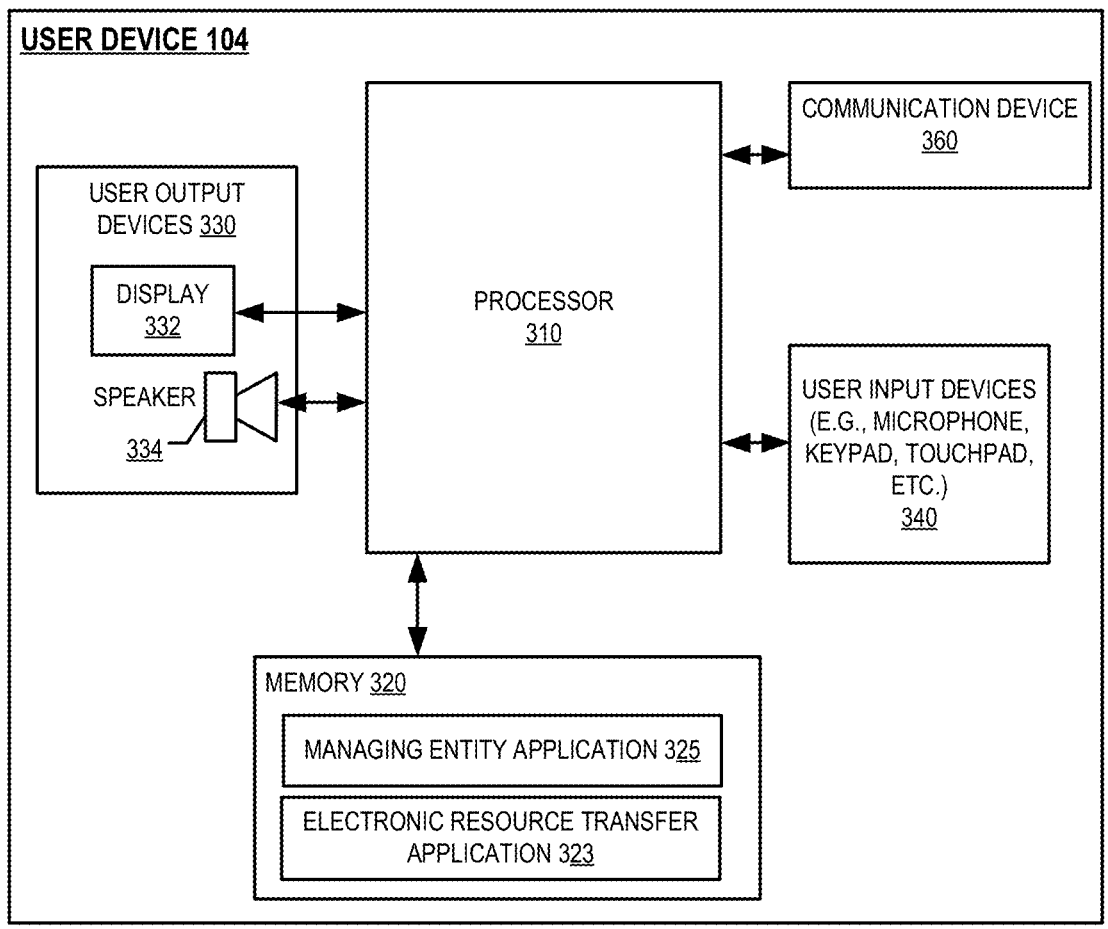
Figure 4:
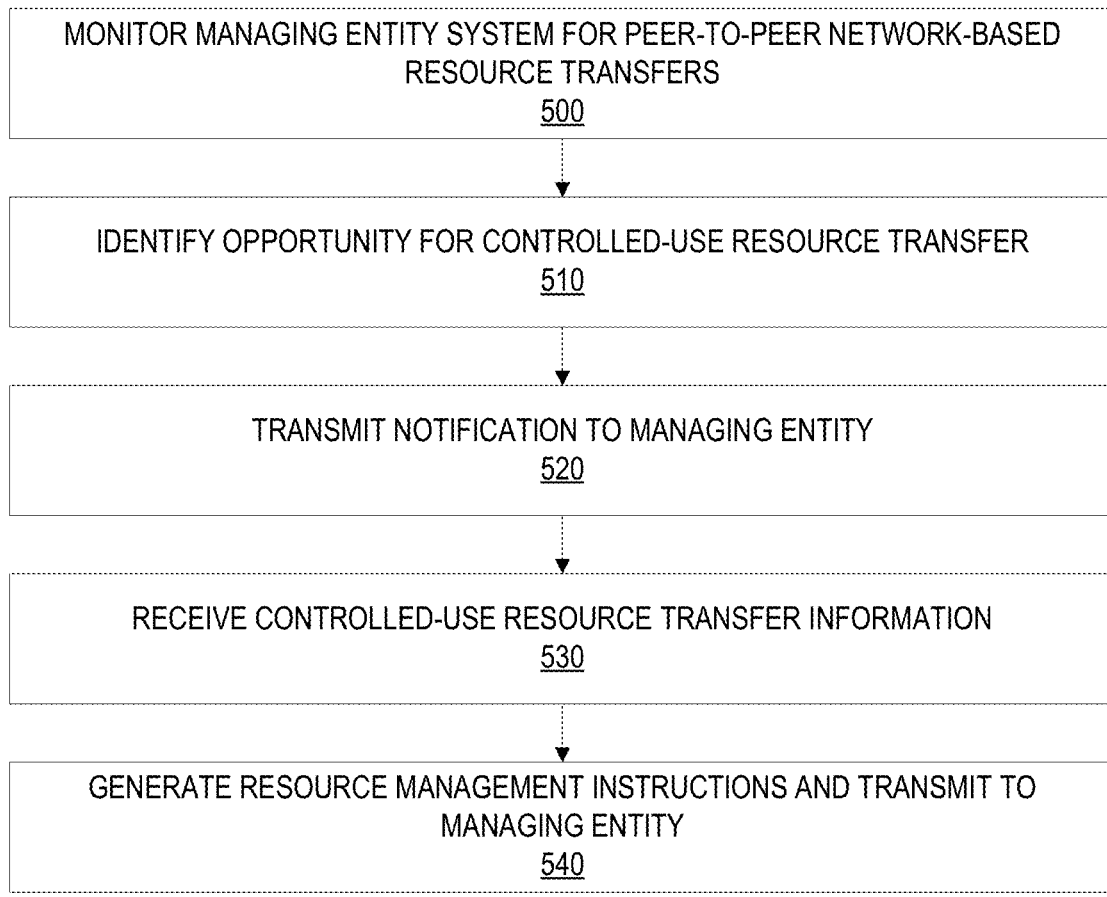
Figure 5:
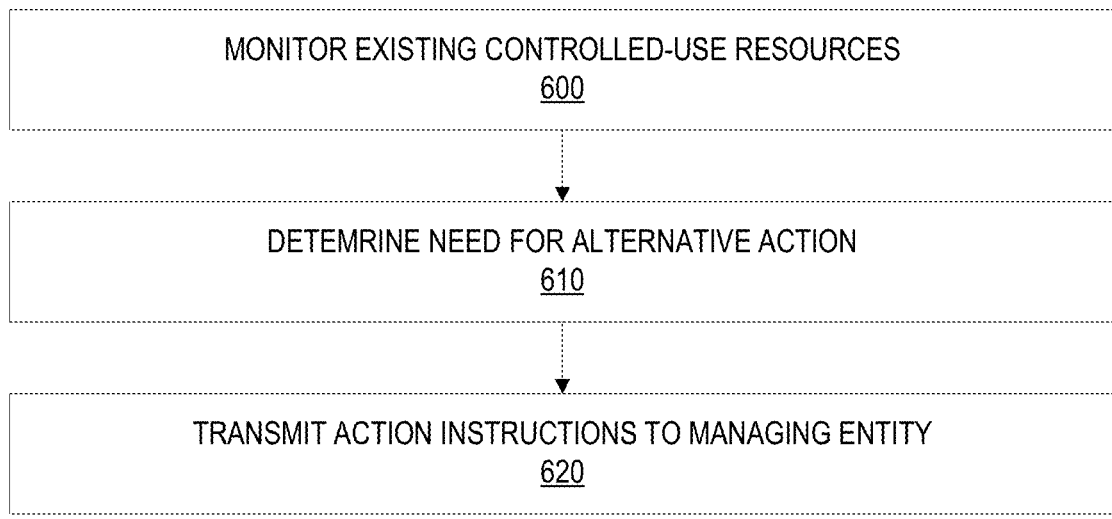

Having thus described embodiments of the invention in general terms, reference will now be made to the accompanying drawings, wherein:

FIG. 1 illustrates an operating environment for the controlled-use resource management system, in accordance with one embodiment of the present disclosure;

FIG. 2 is a block diagram illustrating the controlled-use resource management system, in accordance with one embodiment of the present disclosure;

FIG. 3 is a block diagram illustrating a user device associated with the controlled-use resource management, in accordance with one embodiment of the present disclosure;

FIG. 4 is a flow diagram illustrating a process using the controlled-use resource management system, in accordance with one embodiment of the present disclosure; and FIG. 5 is a flow diagram illustrating another process using the controlled-use resource management system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like which employs information technology resources and particularly technology infrastructure configured for processing large amounts of data. This data can be related to the people who work for the entity, its products or services, the customers, vendors, or any other aspect of the operations of the entity. As such, the entity or managing entity may be any institution, group, association, establishment, authority, or the like, employing information technology resources for processing large amounts of data.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some embodiments, a user may be an employee (e.g., an associate, a manager, an administrator, or the like) of the entity or enterprises affiliated with the entity, capable of operating the systems described herein. In some instances, a "user" is an individual who has a relationship with the entity, such as a customer or a prospective customer. In other embodiments, a user may be a system performing one or more tasks described herein. "Sender" may refer specifically to any user as defined herein that is involved in initiating an electronic resource transfer to another party. "Recipient" may refer specifically to any user as defined herein that receives an electronic resource transfer from another party.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

The system allows for the generation and use of controlled-use electronic resources, which allow the sender of an electronic resource transfer to limit the ways in which the recipient may use the received resources. For example, a sender may transfer a controlled-use resource which is limited to a particular merchant such as a restaurant, retail store, gym, movie theater, grocery store, or the like. Additionally or alternatively, a sender may transfer a controlled-use resource which is limited to a particular category of spending, such as coffee, gasoline, entertainment, or the like. This system may benefit a sender in a variety of ways. In some scenarios, such as a parent transferring resources to a child, the sender is able to maintain control over the products or services purchased with said resources. In other scenarios, such as a sender transferring electronic resources in lieu of another type of gift, the sender may be able to personalize the transfer for the recipient by selecting a favorite merchant or spending category of the recipient. The system may also benefit a plurality of merchants and other third party entities which may obtain new customers as a result of said customers receiving controlled-use resources designated for said merchants.

FIG. 1 illustrates an operating environment 100 for the controlled-use resource management system, in accordance with one embodiment of the present disclosure. As illustrated, the operating environment 100 may comprise a sender 102, a recipient 103, and/or one or more user devices 104 in operative communication with one or more third party systems 400 (e.g., third party merchant systems). The operative communication may occur via a network 101 as depicted, or in some embodiments the recipient 103 may be physically present at a location associated with the third party, such as a computer terminal or point-of-sale device located within a storefront. The operating environment also includes a managing entity system 300, a controlled-use resource system 200, and/or other systems/devices not illustrated herein and connected via a network 101. As such, the sender 102 may complete a resource transfer with the recipient 103 by establishing operative communication channels between two user devices 104 and the managing entity system 300, and the third party system 400 via a wireless network 101. The recipient 103 may also complete a resource transfer by establishing operative communication channels between one of the user devices 104, the managing entity system 300, and the third party system 400. In other embodiments, the recipient 103 may complete a resource transfer with the third party by interfacing directly with the third party system 400, which may then establish operative communication with the managing entity system 500 via a wireless network in order to execute the resource transfer.

Typically, the controlled-use resource system 200 and the one or more third party system 400 are in operative communication with the managing entity system 300, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user devices 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, entertainment devices, laptop computers, cameras, video recorders, audio/video player, radio, GPS devices, any combination of the aforementioned, or the like. The user device is described in greater detail with respect to FIG. 3.

The managing entity system 300 may comprise a communication module and memory not illustrated and may be configured to establish operative communication channels with the controlled-use resource system 200 and/or the one or more third party systems 400 via a network 101. The managing entity system 300 may comprise a user data repository which stores user account data. This data may be used by the managing entity to facilitate resource transfers between the sender 102, recipient 103, user devices 104, and/or the third party system 400. In some embodiments, the managing entity system is in operative communication with the controlled-use resource system 200 via a private communication channel. The private communication channel may be via a network 101 or the controlled-use resource system 200 may be fully integrated within the managing entity system 300.

As will be discussed in greater detail in FIG. 4, the managing entity system 300 may communicate with the controlled-use resource system 200 in order to transmit data associated with electronic resource transfers between a sender 102 and recipient 103, as well as transaction data associated with resource transfers between a recipient 103 and a third party system 400. In some embodiments, the managing entity may utilize the features and functions of the controlled-use resource system 200 to identify and/or initiate potential controlled-use resource transfers between users. The managing entity may also utilize the features and functions of the controlled-use resource system 200 to monitor the status of existing controlled-use resources and execute one or more actions relating to unused resources.

FIG. 2 illustrates a block diagram of the controlled-use resource system 200 associated with the operating environment 100, in accordance with embodiments of the present invention. As illustrated in FIG. 2, the controlled-use resource system 200 may include a communication device 210, a processing device 220, and a memory device 230 having a identification engine 270, a resource management module 280, a processing system application 250 and a processing system datastore 260 stored therein. As shown, the processing device 220 is operatively connected to and is configured to control and cause the communication device 210 and the memory device 230 to perform one or more functions. In some embodiments, the resource management module 280, the identification engine 270 and/or the processing system application 250 comprise computer readable instructions 240 that when executed by the processing device 220 cause the processing device 220 to perform one or more functions and/or transmit control instructions to the managing entity system 300, the third party system(s) 400, the user device(s) 104, and/or the communication device 210. It will be understood that the resource management module 280, the identification engine 270 and/or the processing system application 250 may be executable to initiate, perform, complete, and/or facilitate one or more portions of any embodiments described and/or contemplated herein. The resource management module 280 may comprise executable instructions associated with data processing and analysis related to generation and management of controlled-use electronic resources and may be embodied within the processing system application 250 in some instances. The controlled-use resource system 200 may be owned by, operated by and/or affiliated with the same managing entity that owns or operates the managing entity system 300. In some embodiments, the controlled-use resource system 200 is fully integrated within the managing entity system 300.

The identification engine 270 may further comprise a data analysis module 271, a machine learning engine 272, and a machine learning dataset(s) 273. The data analysis module 271 may store instructions and/or data that may cause or enable the controlled-use resource system 200 to receive, store, and/or analyze data received by the managing entity system 300, the user device(s) 104, and/or the third party system 400. The data analysis module may process data and/or metadata to identify opportunities for controlled-use resource transfers as will be further discussed in FIG. 4. The machine learning engine 272 and machine learning dataset(s) 273 may store instructions and/or data that cause or enable the controlled-use resource system 200 to determine, in real-time and based on received information, whether a pending network-based resource transfer may be eligible to be executed as a controlled-use resource transfer. The machine learning dataset(s) 273 may contain data queried from the managing entity system 300, user device(s) 104, and/or may be based on historical data relating to the sender 102, recipient 103, past controlled-resource transactions, or the like.

The machine learning engine 272 may receive data from a plurality of sources and, using one or more machine learning algorithms, may generate one or more machine learning datasets 273. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

The machine learning datasets 273 may include machine learning data linking two or more transfer factors (e.g. sender data, recipient data, sender historical transaction data, recipient historical transaction data, transfer amount, transfer description, and/or the like) to identify one or more patterns or transfer sequences that may aid in predicting whether a sender will choose to execute a particular network-based resource transfer as a controlled-use resource transfer. For instance, the machine learning datasets 262 may include data linking a recipient's date of birth with an increased likelihood of receiving controlled-use resource transfers. Thus, this data may enable the controlled-use resource system 200 to predict a future controlled-use resource transfer between another sender and another recipient.

The communication device 210 may generally include a modem, server, transceiver, and/or other devices for communicating with other devices on the network 101. The communication device 210 may be a communication interface having one or more communication devices configured to communicate with one or more other devices on the network 101, such as the managing entity system 300, the user device(s) 104, the third party system(s) 400, and/or other processing systems, data systems, and the like Additionally, referring to the controlled-use resource system 200 illustrated in FIG. 2, the processing device 220 may generally refer to a device or combination of devices having circuitry used for implementing the communication and/or logic functions of the data obfuscation system 200. For example, the processing device 220 may include a control unit, a digital signal processor device, a microprocessor device, and various analog-to-digital converters, digital-to-analog converters, and other support circuits and/or combinations of the foregoing. Control and signal processing functions of the data obfuscation system 200 may be allocated between these processing devices according to their respective capabilities. The processing device 220 may further include functionality to operate one or more software programs based on computer-executable program code 240 thereof, which may be stored in a memory device 230, such as the processing system application 250 and the identification engine 270. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 220 may be configured to use the network communication interface of the communication device 210 to transmit and/or receive data and/or commands to and/or from the other devices/systems connected to the network 101.

The memory device 250 within the controlled-use resource system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

FIG. 3 illustrates a block diagram of one of the one or more user devices associated with the controlled-use resource system, in accordance with embodiments of the present invention. The user device 104 may include a user mobile device or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, entertainment devices, laptop computers, cameras, video recorders, audio/video player, radio, GPS devices, any combination of the aforementioned devices.

The user device 104 may generally include a processing device or processor 310 communicably coupled to devices such as, a memory device 350, user output devices 340 (for example, a user display or a speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like.

The processor 310 may include functionality to operate one or more software programs or applications, which may be stored in the memory device 320. For example, the processor 310 may be capable of operating applications such as a resource transfer application 323, a managing entity application 325, or a web browser application. The resource transfer application may then allow the user device 104 to transmit and receive data and instructions to or from the third party system 300 and/or another user device 104. The managing entity application 325 may allow the user device 104 to transmit and receive data to or from the managing entity system 300 (for example, via wireless communication or NFC channels), data and instructions to or from the controlled-use resource system 200, web content, such as, for example, location-based content and/or other web page content, according to a Wireless Application Protocol (WAP), Hypertext Transfer Protocol (HTTP), and/or the like. The managing entity application 325 may allow the managing entity 300 to present a recipient 103 with a report or graphical display of available controlled-use resource amounts and other information.

The processor 310 may be configured to use the communication device 360 to communicate with one or more devices on a network 101 such as, but not limited to the third party system 400, the managing entity system 300, and other user devices 104. In this regard the processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 330 in order to allow a sender 102 or recipient 103 to execute some or all of the processes described herein. The application interface may have the ability to connect to and communicate with an external data storage on a separate system within the network 101. The user output devices 330 may include a display 332 (e.g., a liquid crystal display (LCD) or the like) and a speaker 334 or other audio device, which are operatively coupled to the processor 310. The user input devices 340, which may allow the user device 104 to receive data from the sender 102 or recipient 103, may include any of a number of devices allowing the user device 104 to receive data, such as a keypad, keyboard, touch-screen, touchpad, microphone, mouse, joystick, other pointer device, button, soft key, and/or other input device(s).

The user device 104 may also include a memory buffer, cache memory or temporary memory device 320 operatively coupled to the processor 310. As used herein, memory may include any computer readable medium configured to store data, code, or other information. The memory device 320 may include volatile memory, such as volatile Random Access Memory (RAM) including a cache area for the temporary storage of data. The memory device 320 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the controlled-use resource system 200 performing one or more steps described herein in conjunction with other devices and systems, either automatically based on executing computer readable instructions of the memory device 230, or in response to receiving control instructions from the managing entity system 300. In some instances, the system refers to the devices and systems on the operating environment 100 of FIG. 1. The features and functions of various embodiments of the invention are be described below in further detail. It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 is a high-level process flow diagram illustrating a process using the controlled-use resource system, in accordance with one embodiment of the present disclosure. The process begins at block 500, where the controlled-resource system 200 monitors the managing entity system 300 for pending network-based resource transfers. In some embodiments, as a sender 102 initiates a network-based resource transfer via an electronic resource transfer application 323 of a user device 104, the managing entity system 300 transmits transfer data in real time to the system 200. The system may receive, for example, information identifying the sender, information identifying the recipient, a transaction amount, and/or a transaction description as such data is inputted into the user device 104. The process may continue to block 610, wherein for each pending resource transfer, the system may utilize the identification engine 270 to determine, based on the received transaction data, the machine learning datasets 273, historical data, and/or additional data from the managing entity system 300 or user device 104, whether the sender 102 should be offered an opportunity to complete the resource transfer as a controlled-use resource transfer.

The process may then continue to block 520 of FIG. 4, wherein after the system has determined that a sender 102 should be offered an opportunity to complete the resource transfer as a controlled-use resource transfer, the system transmits instructions to the managing entity system 300. In some embodiments, the instructions may direct the managing entity system to present the sender 102 with an option, via the managing entity application 325 or electronic resource transfer application 323, to select a category, third party merchant, or other limitation type to apply to the resource transfer. In some embodiments, the sender 102 may be presented with merchant or category suggestions based on a transaction history of the recipient 103, a location of the recipient 103, a text description of the transfer, or the like. For example, in some embodiments, if the sender 102 enters "Coffee" into the description body of a pending resource transfer, the system may instruct the managing entity system to present the sender 102 with a plurality of coffee shops near the recipient 103. The sender may then select one of the plurality of coffee shops, limiting the use of the resource transfer to transactions at the selected coffee shop.

The process may then continue to block 530, where, after completion of the network-based resource transfer by the sender 102, the system receives, from the managing entity system, completed transfer data. The completed transfer data may include information identifying the merchant, category, or other resource limitations which have been selected by the sender 102. This data may be stored by the system as a new machine learning dataset 273 and may be used to aid in future analysis by the identification engine 270. The process may conclude at block 540, where the system may generate, via the resource management module 280, management instructions which are transmitted to the managing entity system. In some embodiments, the management instructions may instruct the managing entity to create a temporary or holding account for the recipient 103 of the transfer. The instructions may then direct the managing entity to route the network-based transfer into said temporary account. In some embodiments, the managing entity may be directed to transmit a notification of the transfer to a user device 104 of the recipient 103. Additionally or alternatively, the managing entity may update the display of the managing entity application 325 on the user device 104 to indicate the amount of transferred resources that are available to the recipient, as well as where or how the resources may be used as determined by the sender's limitation selections. The display may also include instructions for use of the controlled-use resources, such as a QR code or barcode which may be scanned at a merchant, a code or serial number for input at a merchant terminal, or the like.

FIG. 5. is a high-level process flow diagram illustrating another process using the controlled-use resource system, in accordance with one embodiment of the present disclosure. The process begins at block 600, wherein the system continuously monitors transactions executed by one or more recipients 103 of controlled-use resource transfers, including transactions using said controlled-use resources. In some embodiments, the system determines 610, based on a triggering event, a need to execute a resource management action. Examples of triggering events include, but are not limited to, a predetermined period of time elapsing since use of the controlled-use resource, a merchant associated with a controlled-use resource ceasing operations, the amount of the controlled-use resource available decreasing below a predetermined threshold amount, the managing entity receiving a recipient request to execute a resource management action, and/or the like.

Based on the type of triggering event, the system may then transmit resource management instructions to the managing entity system in order to execute an appropriate resource management action as shown in block 620. In some embodiments, the resource management action will cause the managing entity system to transfer an amount of controlled-use resources from a recipient's temporary or holding account to another account owned by the recipient 103. Additionally or alternatively, the resource management action will cause the managing entity system to transfer an amount of controlled-use resources from a recipient's temporary or holding account back to an account owned or managed by the original sender 102.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generation and management of controlled-use resources, the system comprising:
   at least one non-transitory storage device; and
   at least one processing device coupled to the at least one non-transitory storage device, wherein the at least one processing device is configured to:

monitor a managing entity system and identify a pending network-based resource transfer;
receive, from the managing entity system, information associated with the pending network-based resource transfer;
determine, based on the received information, that the pending network-based resource transfer is able to be completed as a controlled-use resource transfer; and
transmit, to the managing entity system, instructions to execute the pending network-based resource transfer as a controlled-use resource transfer, wherein the instructions comprise:
prompting a sender, via a user device, to select a recipient of the controlled-use resource transfer, an amount of resources to transfer, and at least one limitation for the controlled-use resource transfer,
creating a temporary account for the recipient, and
depositing the amount of resources into the temporary account.

2. The system of claim 1, wherein the information associated with the pending network-based resource transfer comprises information identifying a sender, information identifying a recipient, a transaction amount, and a transaction description.

3. The system of claim 2, wherein determining, based on the received information, that the pending network-based resource transfer is able to be completed as a controlled-use resource transfer further comprises utilizing a machine learning engine.

4. The system of claim 3, wherein the machine learning engine is configured to analyze at least one of: some or all of the received information, one or more machine learning datasets, or one or more historical datasets to determine whether the pending network-based resource transfer is able to be completed as a controlled-use resource transfer.

5. The system of claim 1, wherein selecting at least one limitation for the controlled-use resource transfer comprises selecting a merchant, a group of a merchants, or a spending category for which the resource amount of the controlled-use resource transfer can be utilized.

6. The system of claim 1, wherein prompting a sender, via a user device, to select a recipient of the controlled-use resource transfer, an amount of resources to transfer, and at least one limitation for the controlled-use resource transfer further comprises presenting, via the user device, a plurality of merchant or spending category suggestions based on a transaction history of the recipient, a location of the recipient, or a text description of the pending network-based transfer.

7. The system of claim 1, wherein the transmitted instructions further comprise presenting, on a user device associated with the recipient, an indication of an amount of controlled-use resources available, a description of a limitation associated with the amount of available controlled-use resources, and a computer-readable code which allows the recipient to utilize the amount of controlled-use resources.

8. The system of claim 1, wherein the processing device is further configured to transmit to the managing entity system, based on identifying a triggering event, instructions to execute a resource management action.

9. The system of claim 8, wherein a triggering event comprises one or more of: a predetermined period of time elapsing since use of a controlled-use resource, a merchant associated with a controlled-use resource ceasing operations, an available amount of controlled-use resources decreasing below a predetermined threshold amount, or the managing entity system receiving a recipient request to execute a resource management action.

10. The system of claim 9, wherein a resource management action comprises at least one of: transferring an amount of controlled-use resources from the temporary account to another account owned by the recipient or transferring an amount of controlled-use resources from the temporary account to an account managed by the sender.

11. A computer program product for generation and management of controlled-use resources, the computer program product comprising at least one non-transitory computer-readable medium having computer-readable program code portions embodied therein, the computer-readable program code portions comprising:
an executable portion configured to monitor a managing entity system and identify a pending network-based resource transfer;
an executable portion configured to receive, from the managing entity system, information associated with the pending network-based resource transfer;
an executable portion configured to determine, based on the received information, that the pending network-based resource transfer is able to be completed as a controlled-use resource transfer; and
an executable portion configured to transmit, to the managing entity system, instructions to execute the pending network-based resource transfer as a controlled-use resource transfer, wherein the instructions comprise:
prompting a sender, via a user device, to select a recipient of the controlled-use resource transfer, an amount of resources to transfer, and at least one limitation for the controlled-use resource transfer,
creating a temporary account for the recipient, and
depositing the amount of resources into the temporary account.

12. The computer program product of claim 11, wherein the information associated with the pending network-based resource transfer comprises information identifying a sender, information identifying a recipient, a transaction amount, and a transaction description.

13. The computer program product of claim 12, wherein determining, based on the received information, that the pending network-based resource transfer is able to be completed as a controlled-use resource transfer further comprises utilizing a machine learning engine, wherein the machine learning engine is configured to analyze at least one of: some or all of the received information, one or more machine learning datasets, or one or more historical datasets to determine whether the pending network-based resource transfer is able to be completed as a controlled-use resource transfer.

14. The computer program product of claim 11, wherein selecting at least one limitation for the controlled-use resource transfer comprises selecting a merchant, a group of a merchants, or a spending category for which the resource amount of the controlled-use resource transfer can be utilized.

15. The computer program product of claim 11, wherein prompting a sender, via a user device, to select a recipient of the controlled-use resource transfer, an amount of resources to transfer, and at least one limitation for the controlled-use resource transfer further comprises presenting, via the user device, a plurality of merchant or spending category suggestions based on a transaction history of the recipient, a location of the recipient, or a text description of the pending network-based transfer.

16. The computer program product of claim 11, wherein the transmitted instructions further comprise presenting, on a user device associated with the recipient, an indication of an amount of controlled-use resources available, a description of a limitation associated with the amount of available controlled-use resources, and a computer-readable code which allows the recipient to utilize the amount of controlled-use resources.

17. The computer program product of claim 11, wherein the processing device is further configured to transmit to the managing entity system, based on identifying a triggering event, instructions to execute a resource management action, wherein a resource management action comprises at least one of: transferring an amount of controlled-use resources from the temporary account to another account owned by the recipient or transferring an amount of controlled-use resources from the temporary account to an account managed by the sender.

18. The computer program product of claim 17, wherein a triggering event comprises one or more of: a predetermined period of time elapsing since use of a controlled-use resource, a merchant associated with a controlled-use resource ceasing operations, an available amount of controlled-use resources decreasing below a predetermined threshold amount, or the managing entity system receiving a recipient request to execute a resource management action.

19. The computer program product of claim 17, wherein a resource management action comprises at least one of: transferring an amount of controlled-use resources from the temporary account to another account owned by the recipient or transferring an amount of controlled-use resources from the temporary account to an account managed by the sender.

20. A computer-implemented method for generation and management of controlled-use resources, the method comprising:

providing a computing system comprising a computer processing device and a non-transitory computer readable medium, wherein the computer readable medium comprises configured computer program instruction code, such that when said instruction code is operated by said computer processing device, said computer processing device performs the following operations:

monitor a managing entity system and identify a pending network-based resource transfer;

receive, from the managing entity system, information associated with the pending network-based resource transfer;

determine, based on the received information, that the pending network-based resource transfer is able to be completed as a controlled-use resource transfer; and transmit, to the managing entity system, instructions to execute the pending network-based resource transfer as a controlled-use resource transfer, wherein the instructions comprise:

prompting a sender, via a user device, to select a recipient of the controlled-use resource transfer, an amount of resources to transfer, and at least one limitation for the controlled-use resource transfer, creating a temporary account for the recipient, and depositing the amount of resources into the temporary account.

* * * * *